(12) United States Patent
Altman et al.

(10) Patent No.: US 8,719,548 B2
(45) Date of Patent: May 6, 2014

(54) METHOD AND SYSTEM FOR EFFICIENT EMULATION OF MULTIPROCESSOR ADDRESS TRANSLATION ON A MULTIPROCESSOR

(75) Inventors: Erik Richter Altman, Danbury, CT (US); Ravi Nair, Briarcliff Manor, NY (US); John Kevin O'Brien, South Salem, NY (US); Kathryn Mary O'Brien, South Salem, NY (US); Peter Howland Oden, Ossining, NY (US); Daniel Arthur Prener, Croton-on-Hudson, NY (US); Sumedh Wasudeo Sathaye, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/085,873

(22) Filed: Apr. 13, 2011

(65) Prior Publication Data

US 2011/0191095 A1 Aug. 4, 2011

Related U.S. Application Data

(63) Continuation of application No. 10/244,559, filed on Sep. 17, 2002, now Pat. No. 7,953,588.

(51) Int. Cl.
*G06F 9/455* (2006.01)
*G06F 12/00* (2006.01)
*G06F 9/26* (2006.01)
*G06F 9/34* (2006.01)

(52) U.S. Cl.
USPC ............... 711/207; 711/6; 711/200; 711/201; 711/202; 711/203; 711/204; 711/205; 711/206; 703/24

(58) Field of Classification Search
None
See application file for complete search history.

(56) References Cited

U.S. PATENT DOCUMENTS

| 4,564,903 | A | | 1/1986 | Guyette et al. |
|---|---|---|---|---|
| 5,388,215 | A | * | 2/1995 | Baker et al. ................... 709/229 |
| 5,440,710 | A | | 8/1995 | Richter et al. |
| 5,574,878 | A | | 11/1996 | Onodera et al. |
| 5,615,327 | A | | 3/1997 | Magee et al. |
| 5,619,665 | A | | 4/1997 | Emma |

(Continued)

FOREIGN PATENT DOCUMENTS

| JP | 08-087424 A | 4/1996 |
|---|---|---|
| JP | 08-272686 A | 10/1996 |
| WO | WO 99/03037 A1 | 1/1999 |

OTHER PUBLICATIONS

Rosenburg, Bryan. Low-synchronization translation lookaside buffer consistency in large-scale shared-memory multiprocessors., 1989. ,vol. 23. No. 5., ACM, pp. 137-146.*

(Continued)

*Primary Examiner* — Yaima Rigol
(74) *Attorney, Agent, or Firm* — Daniel P. Morris; McGinn IP Law Group, PLLC

(57) ABSTRACT

A method (and structure) of mapping a memory addressing of a multiprocessing system when it is emulated using a virtual memory addressing of another multiprocessing system includes accessing a local lookaside table (LLT) on a target processor with a target virtual memory address. Whether there is a "miss" in the LLT is determined and, with the miss determined in the LLT, a lock for a global page table is obtained.

10 Claims, 7 Drawing Sheets

(56) References Cited

U.S. PATENT DOCUMENTS

| | | | |
|---|---|---|---|
| 5,668,969 A | 9/1997 | Fitch | |
| 5,678,032 A | 10/1997 | Woods et al. | |
| 5,768,593 A | 6/1998 | Walters et al. | |
| 5,832,205 A | 11/1998 | Kelly et al. | |
| 5,983,012 A | 11/1999 | Bianchi et al. | |
| 6,031,992 A | 2/2000 | Cmelik et al. | |
| 6,075,937 A | 6/2000 | Scalzi et al. | |
| 6,075,938 A | 6/2000 | Bugnion et al. | |
| 6,134,515 A | 10/2000 | Skogby | |
| 6,158,049 A | 12/2000 | Goodwin et al. | |
| 6,289,369 B1 | 9/2001 | Sundaresan | |
| 6,345,351 B1* | 2/2002 | Holmberg | 711/203 |
| 6,381,682 B2 | 4/2002 | Noel et al. | |
| 6,463,582 B1 | 10/2002 | Lethin et al. | |
| 6,480,845 B1 | 11/2002 | Egolf et al. | |
| 6,728,950 B2 | 4/2004 | Davis et al. | |
| 6,763,328 B1 | 7/2004 | Egolf et al. | |
| 6,883,165 B1 | 4/2005 | Blandy et al. | |
| 6,915,513 B2 | 7/2005 | Duesterwald et al. | |
| 6,934,832 B1* | 8/2005 | Van Dyke et al. | 712/244 |
| 7,047,394 B1* | 5/2006 | Van Dyke et al. | 712/209 |
| 7,080,366 B2 | 7/2006 | Kramskoy et al. | |
| 7,089,539 B2 | 8/2006 | Dornan et al. | |
| 7,093,231 B2 | 8/2006 | Nuss | |
| 7,134,119 B2 | 11/2006 | Nevill | |
| 7,275,028 B2* | 9/2007 | Traut | 703/23 |
| 7,735,073 B1 | 6/2010 | Kosche et al. | |
| 8,065,504 B2* | 11/2011 | Yates et al. | 712/209 |
| 8,121,828 B2* | 2/2012 | Yates et al. | 703/26 |
| 8,146,063 B2 | 3/2012 | Lindwer et al. | |
| 2002/0066086 A1 | 5/2002 | Linden | |
| 2002/0082823 A1* | 6/2002 | Traut | 703/27 |
| 2002/0144081 A1* | 10/2002 | Willis et al. | 711/206 |
| 2003/0182653 A1 | 9/2003 | Desoli et al. | |
| 2003/0196142 A1* | 10/2003 | Brooks | 714/28 |
| 2004/0019886 A1 | 1/2004 | Berent et al. | |
| 2009/0204785 A1* | 8/2009 | Yates et al. | 711/205 |

OTHER PUBLICATIONS

United States Office Action dated Nov. 27, 2012 in U.S. Appl. No. 10/244,434.

Lamport, L., "How to Make a Multiprocessor Computer that Correctly Executes Multiprocess Programs", IEEE Transactions on Computers, C-28, Sep. 9, 1979, pp. 690-691.

"Prototype Real-Time monitor: Design" R. Van Scoy et al., Technical Report CMU/SEI-87-TR-038 ESD-TR-87-201, Nov. 1987.

Bali, T., et al., "Efficient Path Profiling", IEEE Proceedings of MICRO-29, Dec. 2-4, 1996, pp. 1-12.

Magnusson, P.S., "A Design for Efficient Simulation of a Multiprocessor", Proceedings of the First International Workshop on Modeling, Analysis, and Simulation of Computer and Telecommunication Systems (MASCOTS), La Jolia, CA Jan. 1993, pp. 69-78.

Lamport L., "How to Make a Multiprocessor Computer that Correctly Executes Multiprocess Programs", IEEE Transactions on Computers, C-28, Sep. 9, 1979, pp. 690-691.

Adve, S. et al. "Shared Memory Consistency Models: A Tutorial", IEEE Computer, vol. 29, No. 12, Dec. 1996, pp. 66-76.

Nichols, B. et al., Pthreads programming: A POSIX Standard for Better Multiprocessing (O'Reilly Nutsell), Sep. 1996.

"Java Multithreading", David Nelson-Fal et al., Jun. 1, 1998, Java Developer's Journal, pp. 1-4, http://jdj-sys-con.com/read/35997.btm.

IBM, "Low-Synchronization Translation Lookaside Buffer Consistency Algorithm" (ID NB9011426), IBM Technical Disclosure Bulletin, Nov. 1990 vol. 33 Issue 6B p. 428-433.

Herrod, S.A., "Using Complete Machine Simulation to Understand Computer System Behavior", Ph.D. Thesis, Stanford University, Feb. 1998.

Turley, J., "Alpha Runs x86 Code with FX132", Microprocessor Report, Mar. 5, 1996.

May, C., "Mimic: A Fast System/370 Simulator", Proceedings of the Object Oriented Programming Systems Languages and Applications Conference (OOPSLA), Orlando, FL., Oct. 4-8, 1987, Special Issue of Sigplan Notices, Dec. 1987, vol. 22, No. 7, Jun. 24.

Bala, V., et al., "Dynamo: A Transparent Dynamic Optimization System", Conference on Programming Language Design and Implementation, 2000, pp. 1-12.

Burke, M.G., et al., "The Jalapeno Dynamic Optimizing Compiler for JavaTM", IBM Thomas J. Watson Research Cener Technical Paper, Mar. 1999, 13 pages (published 1999 ACM Java Grande Conference Proceedings, San Francisco, CA, Jun. 12-14, 1999).

United States Office Action dated Jul. 3, 2013 in U.S. Appl. No. 10/244,434.

United States Notice of Allowance dated Jun. 25, 2013 in U.S. Appl. No. 13/311,858.

Ung et al., Machine-adaptable dynamic binary translation, Jan. 2000, 11 pages.

Cifuentes et al., Experience in the design, implementation and use of a retargetable static binary translation framework, Jan. 2002, 59 pages.

\* cited by examiner

| VALIDITY/ STATUS BITS | PROCESS ID | VIRTUAL ADDRESS | REAL ADDRESS | PROTECTION BITS | LOOKASIDE MASK |
|---|---|---|---|---|---|
| | | | | | 01100010 |
| | | | | | 00010000 |
| | | | | | |
| | | | | | |
| | | | | | |

FIG.9

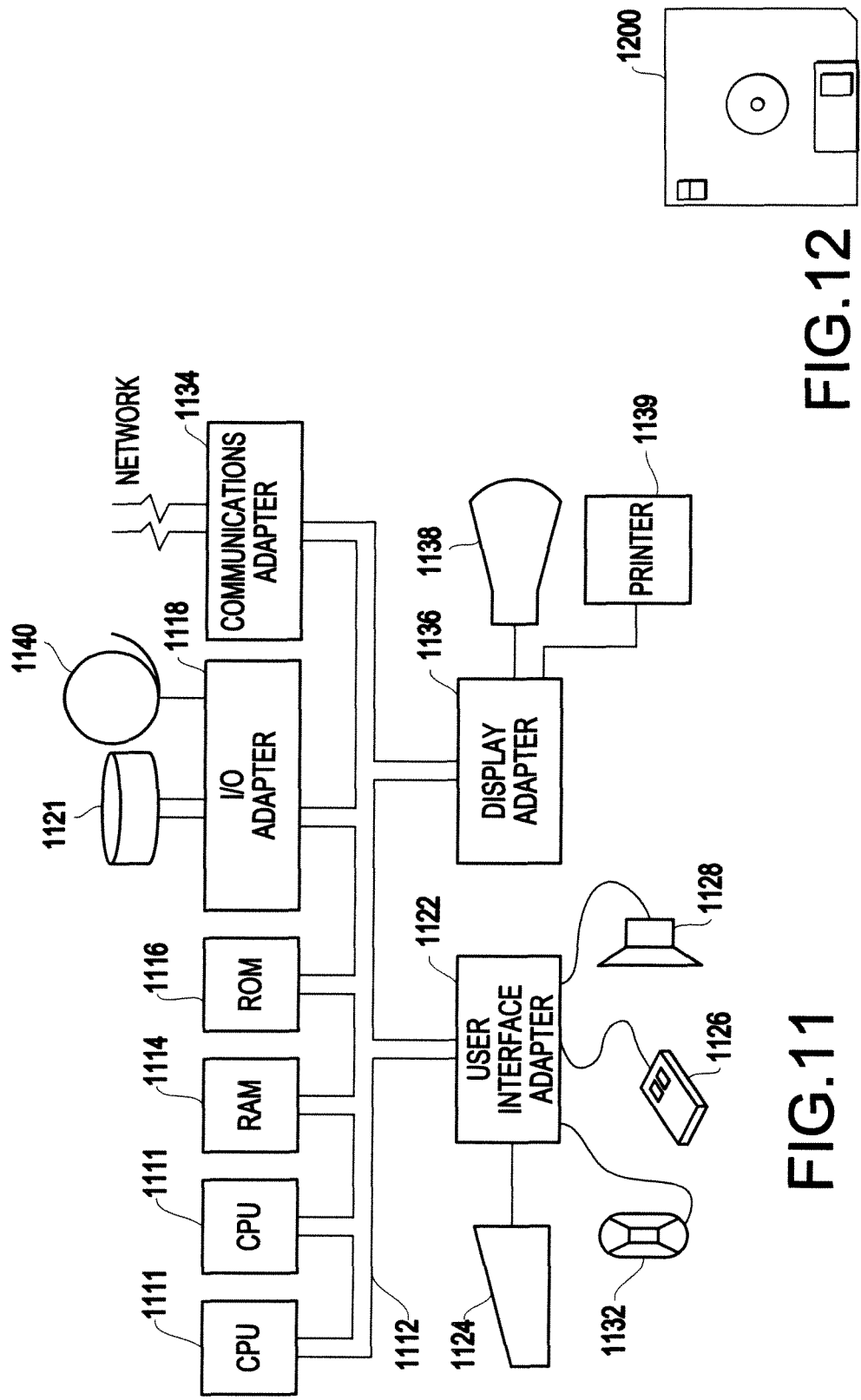

METHOD AND SYSTEM FOR EFFICIENT EMULATION OF MULTIPROCESSOR ADDRESS TRANSLATION ON A MULTIPROCESSOR

The present application is a continuation application of U.S. patent application Ser. No. 10/244,559, filed on Sep. 17, 2002, now U.S. Pat. No. 7,953,588, issued on May 31, 2011.

The present application is related to:

U.S. patent application Ser. No. 10/244,434, filed on Sep. 17, 2002, to Ravi Nair et al., entitled "METHOD AND SYSTEM FOR EFFICIENT EMULATION OF MULTIPROCESSOR MEMORY CONSISTENCY";

U.S. patent application Ser. No. 10/244,414, filed Sep. 17, 2002, to Erik R. Altman et al., entitled "METHOD AND SYSTEM FOR MULTIPROCESSOR EMULATION ON A MULTIPROCESSOR HOST SYSTEM";

U.S. patent application Ser. No. 10/244,682, filed on Sep. 17, 2002, to Ravi Nair et al., entitled "HYBRID MECHANISM FOR MORE EFFICIENT EMULATION AND METHOD THEREFOR"; and U.S. patent application Ser. No. 10/244,564, filed on Sep. 17, 2002, to Nair et al., entitled "METHOD AND SYSTEM FOR TRANSPARENT DYNAMIC OPTIMIZATION IN A MULTIPROCESSING ENVIRONMENT", each assigned to the present assignee, and incorporated herein by reference.

BACKGROUND OF THE INVENTION

1. Field of the Invention

The present invention generally relates to computer systems, and more particularly to a method for mapping the shared memory of a multiprocessing computer system when it is simulated on another multiprocessing computing system.

2. Description of the Related Art

A computing system includes several parts, including the processors, the memory and the input/output devices. It is often necessary to emulate the behavior of one computing system on another.

One of the principal reasons for emulation is to enable programs written for a system (e.g., a "target computing system"), to perform with the same results on another system (e.g., a "host computing system"). Several techniques have been described to emulate the instruction set of one processor using the instruction set of another processor (e.g., SIMOS as disclosed by Stephen A. Herrod, "Using Complete Machine Simulation to Understand Computer System Behavior," Ph.D. Thesis, Stanford University, February 1998; or MIMIC as disclosed in Cathy May, "Mimic: A Fast System/370 Simulator", Proceedings of the Object Oriented Programming Systems Languages and Applications Conference, (OOPSLA), Orlando, Oct. 4-8, 1987, Special Issue of Sigplan Notices, vol. 22, No. 12, December 1987, vol. 22, No. 7, June 24).

To perform the emulation faithfully, it is necessary also to emulate the behavior of memory in such a system. Typically, the behavior includes more than reading and writing locations in memory with program-specified addresses.

More particularly, when virtual memory is implemented on the target system, as is usually the case, an access to a memory location may involve verifying whether the requesting task has the right to perform the access operation. It may also involve bringing in the page containing the requested location to memory, if it is not already in memory.

Such functions are typically performed as illustrated in the system 100 shown in FIG. 1, where a calculated operand address is input, as a target virtual memory address, into a target page mapping table 110.

Thus, in FIG. 1, the page containing an addressed location is checked in the table 110, to see whether (a) it is already in memory (e.g., target real memory 120), (b) whether it permits the access desired, and (c) what physical memory location corresponds to the desired page. It is noted again that each of these operations is performed in the actual hardware of the target system.

To make such an access efficient, these checks are performed in hardware in the emulating machine, and often simultaneously with the actual memory access, with the results of the access discarded if access is denied. The output of the target real memory 120 is an operand value which may correspond to a LOAD, etc. (It is noted a STORE would go the other way through the host).

Typically, the host computing system also provides hardware to facilitate such virtual addressing. Implementations like those disclosed in U.S. Pat. No. 6,075,937, to Scalzi et al., interpret target accesses in terms of primitives supported by the host virtual addressing hardware. This is shown in the system 200 of FIG. 2 which utilizes a simulated page mapping table 210 and a host real memory 220.

The mapping of virtual addresses to real addresses in host real memory 220 done through the page mapping table 210 is unique for each virtual address space (often associated with a "process") on the target system.

It is noted that the simulated page mapping table 210 differs from the target page mapping table 110 in that the operating system has page mapping tables therein which map virtual pages to real pages of the host real memory. However, in FIG. 2, this will not be operable (e.g., not work) since the real memory must address the host real memory, not the target real memory. Hence, the map must include another field which indicates where the real memory is which is being mapped into the host real memory.

If the host system also implements a virtual memory and if the allowed virtual address space for each host process is at least as large as the address space allowed on the target, then emulation can be performed at the process level as shown in the structure 300 of FIG. 3, having a target-to-host virtual address mapper 310, a host page mapping table 320, and a host real memory 330.

In the scheme of FIG. 3, a target virtual address space is mapped to a host virtual address space by mapper 310, which is then converted to the host real address space using the host's page mapping table mechanisms 320.

Thus, in FIG. 3, in the front end, instead of having a simulated page mapping table (e.g., table 210 in FIG. 2), the target-to-host virtual address mapper 310 is provided, so that the target virtual address can be converted to a host virtual address, and then uses the operating system of the host to do the rest of the mapping.

Basically, the scheme behind FIG. 3 recognizes that the functional blocks of FIG. 2 cannot be performed on an operating system of the host. Hence, FIG. 3 aims to take a target virtual memory address and convert it into something (e.g., a host virtual memory address) that can be used by the operating system which is running on the host system. The operating system running on the host has its own page mapping tables which can recognize and understand only virtual memory addresses in its environment (e.g., the host virtual memory addresses). Thus, once the host virtual memory addresses are obtained, the rest of the mapping can be performed in the host.

However, both of these schemes prove inadequate in an emulation environment such as that described in the above-mentioned U.S. patent application Ser. No. 10/244,414,filed concurrently herewith, to Altman, et al., entitled "METHOD AND SYSTEM FOR MULTIPROCESSOR EMULATION ON A MULTIPROCESSOR HOST SYSTEM". In such an environment, the simulation of a processor in the target multiprocessing system is not directly performed by a unique processor in the host multiprocessing system.

Instead, the tasks of emulating the processors are pooled along with other auxiliary tasks needed on the host, and a scheduler on the host allocates these tasks to available processors. An advantage of this scheme is the possibility of emulating a system which may have more processors than the processors available on the host.

The scheme disclosed in U.S. Pat. No. 6,075,937, to Scalzi et al. requires that each target processor be mapped to a host processor. That is, such a system requires a one-to-one correspondence, and hence is not well-suited for such an emulation.

The virtual mapping scheme is a possible candidate, except that it requires that emulation software know about the partitioning of tasks in the target system into processes. This may often not be possible unless the emulation system understands the system software being emulated.

That is, it must be known exactly what is happening in the operating system running on the target (guest) to make the scheme of FIG. 3 work, since the page mapping table of the target (guest) will be replayed to target-to-host virtual address mapper 310, etc. However, this rarely happens because in performing a system emulation of a system, one seldom has control over the software which is running.

Moreover, it is not directly possible to map a 64-bit virtual addressing space of the target, for example, to a 32-bit virtual addressing space of the host. As mentioned earlier, memory must often be reserved also for other functions associated with the emulation, and hence such an emulation may be difficult even in a 64-bit virtual address space for the host.

Therefore, it is desirable to find a solution to the memory mapping problem where the emulation environment does not have a strict correspondence between the target processor being emulated and the host processor that reproduces its behavior (e.g., in a multiprocessing environment where there is a many-to-many mapping), and where the emulation software is cognizant of the page table mapping of the target system, but not the nature of the tasks executing on the target system (e.g., where there is not actual, strict control over the software running on the target).

Prior to the present invention, no such solution has been recognized, let alone developed.

SUMMARY OF THE INVENTION

In view of the foregoing and other problems, drawbacks, and disadvantages of the conventional methods and structures, an object of the present invention is to provide a method and structure which can effectively map the memory addressing of a multiprocessing system when it is emulated using the virtual memory addressing of another multiprocessing system.

In a first aspect of the present invention, a method (and system) for emulating a target system's memory addressing using a virtual-to-real memory mapping mechanism of a host multiprocessor system's operating system, includes inputting a target virtual memory address into a simulated page table to obtain a host virtual memory address. The target system is oblivious to the software it is running on.

In a second aspect of the invention, a method of mapping a memory addressing of a multiprocessing system when it is emulated using a virtual memory addressing of another multiprocessing system, includes accessing a local lookaside table (LLT) on a target processor with a target virtual memory address, determining whether there is a "miss" in the LLT, and with the miss determined in the LLT, obtaining a lock for a global page table.

In a third aspect of the invention, in a host multiprocessor system for emulating the operation of a target n-processor system (n.gtoreq.1) by execution of one or more threads representing the operation of the target system, a method for emulating the target system's memory addressing using a virtual-to-real memory mapping mechanism of the host multiprocessor system's operating system, includes (a) reading a target system virtual memory address (ATV), (b) mapping the ATV to a target real address (ATR), (c) mapping the ATR to a host virtual memory address (AHV), and (d) mapping the AHV to a host real memory address, wherein the emulation of the target system's memory addressing is treated as an application running on the host multiprocessor system.

In a fourth aspect of the invention, a system for emulating a target system's memory addressing, includes a page table for mapping a target virtual memory address from a target system to a host virtual memory address and page access rights, wherein the target system is oblivious to the software it is running on.

In a fifth aspect of the invention, a system for emulating a target system's memory addressing using a virtual-to-real memory mapping mechanism of a host multiprocessor system's operating system, includes a local lookaside table (LLT) for receiving a target virtual memory address and outputting a host virtual memory address and page access rights, if information on the target virtual memory address is stored in the LLT.

In a sixth aspect of the invention, a system for mapping a memory addressing of a multiprocessing system when it is emulated using a virtual memory addressing of another multiprocessing system, includes a local lookaside table (LLT) on a target processor for storing a target virtual memory address and a host virtual memory address corresponding thereto, means for accessing the LLT with a target virtual memory address, means for determining whether there is a "miss" in the LLT, and means, based on an input from the determining means, for obtaining a lock for a global page table.

In a seventh aspect of the invention, a system for multiprocessor emulation of an operation of a target n-processor system (n.gtoreq.1) by execution of one or more threads representing the operation of the target system, includes means for emulating the target system's memory addressing using a virtual-to-real memory mapping mechanism of the host multiprocessor system's operating system, the emulating means includes (a) means for reading a target system virtual memory address (ATV), (b) means for mapping the ATV to a target real address (ATR), (c) means for mapping the ATR to a host virtual memory address (AHV), and (d) means for mapping the AHV to a host real memory address, wherein the emulation of the target system's memory addressing is treated as an application running on the host multiprocessor system.

In an eighth aspect of the invention, a signal-bearing medium tangibly embodying a program of machine-readable instructions executable by a digital processing apparatus to perform a method of emulating a target system's memory addressing using a virtual-to-real memory mapping mechanism of a host multiprocessor system's operating system, the method includes inputting a target virtual memory address into a simulated page table to obtain a host virtual memory address, wherein the target system is oblivious to the software it is running on.

In a ninth aspect of the invention, a signal-bearing medium tangibly embodying a program of machine-readable instructions executable by a digital processing apparatus to perform a method of mapping a memory addressing of a multiprocessing system when it is emulated using a virtual memory addressing of another multiprocessing system, the method includes accessing a local lookaside table (LLT) on a target processor with a target virtual memory address, determining whether there is a "miss" in the LLT; and with the miss determined in the LLT, obtaining a lock for the page table.

In a tenth aspect of the invention, a signal-bearing medium tangibly embodying a program of machine-readable instructions executable by a digital processing apparatus to perform a method of, in a host multiprocessor system, emulating the operation of a target n-processor system (n.gtoreq.1) by execution of one or more threads representing the operation of the target system, a method for emulating the target system's memory addressing using a virtual-to-real memory mapping mechanism of the host multiprocessor system's operating system, includes (a) reading a target system virtual memory address (ATV), (b) mapping the ATV to a target real address (ATR), (c) mapping the ATR to a host virtual memory address (AHV), (d) mapping the AHV to a host real memory address, wherein the emulation of the target system's memory addressing is treated as an application running on the host multiprocessor system.

With the unique and unobvious aspects of the present invention, the memory addressing of a multiprocessing system can be efficiently mapped when it is emulated using the virtual memory addressing of another multiprocessing system.

That is, the invention has provided a unique solution to the memory mapping problem in a multiprocessing environment where there is a many-to-many mapping, and where there is not actual, strict control over the software running on the target.

Further, the invention allows for emulation which efficiently maps the shared memory and specifically enhances emulation by emulating not only operations, but also the memory, the access functions, etc. Indeed, the invention recognizes (and considers) that in any mapping, there is involved both mapping a location to a real location, as well as a mapping of privileges in accessing that location. The invention takes both of these into account.

Hence, the invention can more efficiently and more optimally map the memory address of one system, when it is emulated, using the virtual memory addressing of another system. Using the virtual memory addressing of another system is a major feature of the invention.

That is, there may be techniques where it is possible to perform the mapping directly to a real address of another multiprocessing system. However, the invention allows for using the other system's virtual memory addressing system for emulation. This technique is much superior to the direct mapping mentioned above, since the real memory address is a physical "thing" (structure) which may be limited (e.g., smaller space/capacity). However, using a virtual memory allows for a much larger space when mapping occurs. Thus, a 64-bit virtual memory of the target (guest) can be targeted (mapped) to a 64-bit virtual memory of the host, whereas if the same memory was to be mapped to a real memory, then only 32-bit may be possible.

The scheme includes all of the advantages that are enjoyed by application programs, rather than kernel programs. For example, it is easier to have multiple emulators running simultaneously. It also is possible to take advantage of tools for debugging and/or monitoring for either verifying the correctness of the emulator, or to tune the performance of the emulator.

BRIEF DESCRIPTION OF THE DRAWINGS

The foregoing and other purposes, aspects and advantages will be better understood from the following detailed description of a preferred embodiment of the invention with reference to the drawings, in which:

FIG. 9 shows a table 900 containing the fields in the global page table entry including an additional field to list the simulated processors that have copies of the entry;

FIG. 11 illustrates an exemplary hardware/information handling system 1100 for incorporating the present invention therein; and FIG. 12 illustrates a signal bearing medium 1200 (e.g., storage medium) for storing steps of a program of a method according to the present invention.

DETAILED DESCRIPTION OF PREFERRED EMBODIMENTS OF THE INVENTION

Figure 1:
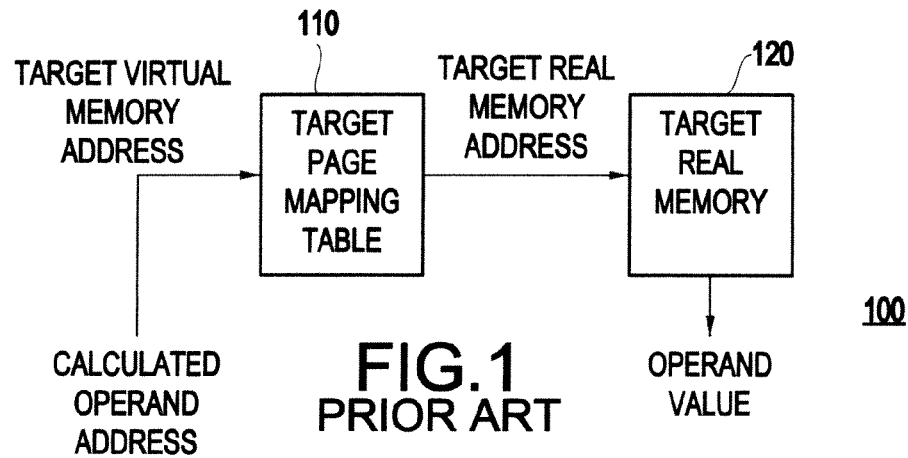
FIG. 1 shows address mapping in a typical virtual memory system 100.
Figure 2:
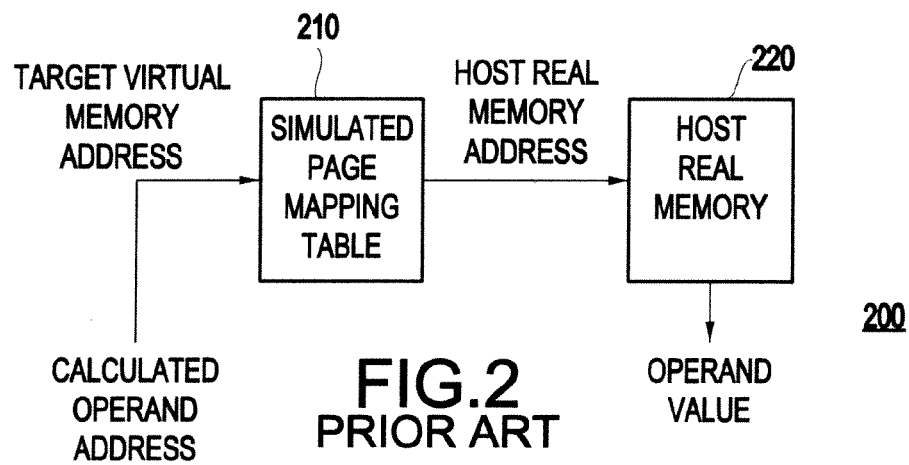
FIG. 2 shows a prior art virtual address simulation scheme 200.
Figure 3:
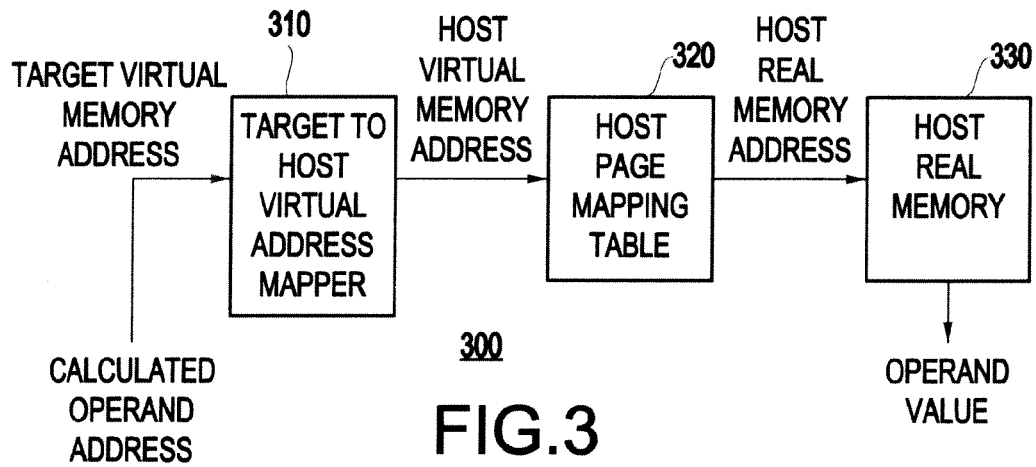
FIG. 3 shows a mapping scheme 300 that requires the knowledge of processes in the target system.

Referring now to the drawings, and more particularly to FIGS. 4-12, there are shown preferred embodiments of the method and structures according to the present invention.

Preferred Embodiment

Prior to turning to the detailed description, it will be assumed that the operating system software of the target already has a mechanism for converting a target virtual address to a target real address.

Such a mapping will depend on the physical real memory on the target system. The locations storing the page table itself are assumed to be known to the emulation system.

The emulation system is assumed to be a process which has a virtual address space reasonably larger than the real address of the emulated target system. This allows a chunk of contiguous virtual address space of the host to be reserved for emulating the real address space of the target.

Figure 4:
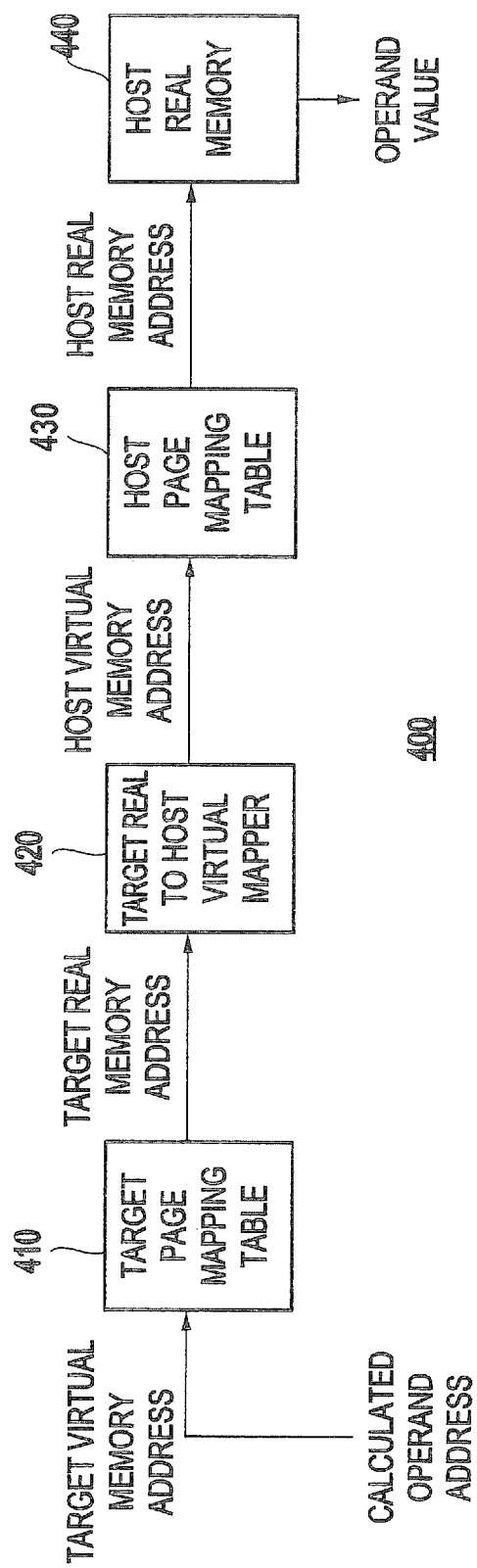
FIG. 4 shows a scheme 400 that maps target real addresses to host virtual addresses.

Thus, turning to FIG. 4, generally and very simplistically, the inventors recognized that the target page mapping table 410 already exists in the target system software, but is left alone, and that the host page mapping table 430 and the host real memory 440 (which suggest an operating system running on the host) are running on the host, and likewise are left alone.

However, the invention takes advantage of the capabilities of the tables 410, 430 and the host real memory 440 (and the operating system running on the host), but places a target real-to-host virtual mapper 420 (e.g., which maps target real addresses to host virtual addresses) between the target and host systems which functions as an interface therebetween.

Thus, as shown in FIG. 4, the operating system of the host converts any address in this space to a real address in its own real address space.

Specifically, the calculated operand address is input, as a target virtual memory address, into the target page mapping table 410 which produces a target real memory address. The target real memory address is input to the target real-to-host virtual mapper 420, which maps the target real memory address to a host virtual address. The host virtual memory address is input to the host page mapping table 430 (already existing and continuously being updated by the host), which produces a host real memory address. The host real memory address is input to the host real memory 440, which produces an operand value (e.g., a LOAD, etc.) (It is noted that a STORE would go the other way through the host real memory 440.)

It is noted that, in this scheme, the real address space of the host and the real address space of the target need not be matched. If the real address space of the host were smaller than that of the target, then pages will be appropriately swapped in and out by the virtual addressing of the host. It is therefore not particularly disadvantageous to have the real address space of the target much larger than the real address space of the host, except that it could make the size of the target page table 410 somewhat large.

Therefore, the parameters of the target multiprocessing system could be set such that its real memory size is much larger than what is physically possible.

Figure 5:
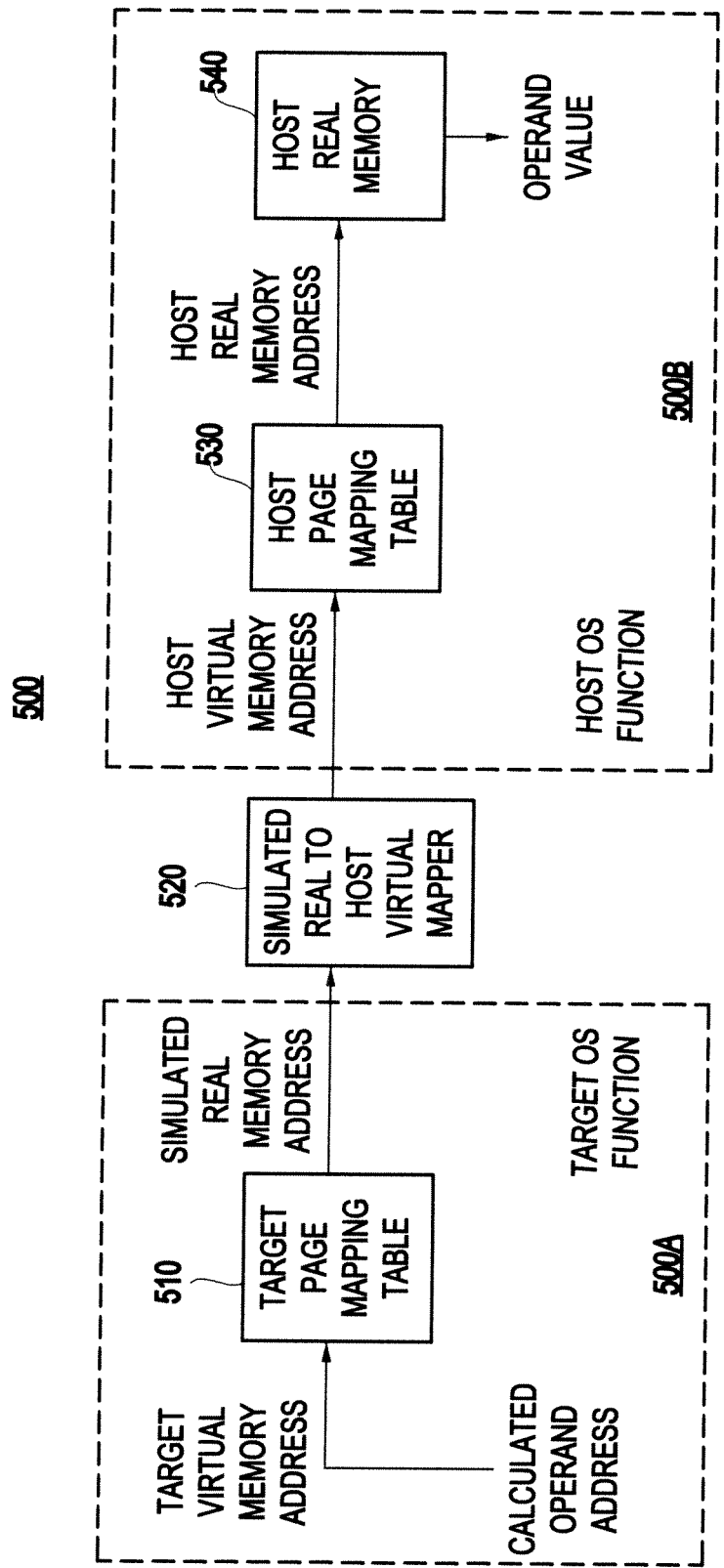
FIG. 5 shows a structure 500 illustrating a partitioning of mapping functions between the operating system on the target and the operating system on the host.

This is shown in FIG. 5, which also shows that the mapping of the target addresses is a function of the emulated operating system, and hence need not be modified or understood by the emulation system.

That is, the system 500 of FIG. 5 shows the target operating system function 500A and the host operating system function 500B are separated by a simulated real to host virtual mapper 520. FIG. 5 differs from FIG. 4 mainly in that the target system may have a certain amount of real memory, then in a system being emulated, it can be pretended (assumed) that it is not the real memory which exists on the host, but it is real memory which is much larger than that which exists on the host. Thus, such an operation would be useful when the real memory of the target is much larger than that available (physically possible) on the host.

Thus, returning to FIG. 5, the target page mapping table 510 will receive the target virtual memory address, and will pass a simulated real memory address of the target to the simulated real-to-host virtual mapper 520. The mapper 520 is similar to that of mapper 420 of FIG. 4, but handles the situation where the real memory of the target is greater than that physically available on the host.

It is noted that this situation (e.g., the real memory of the target is larger) does not occur very frequently, and is not preferable because the applications may begin "using the virtual memory to a large degree" where the applications do not have enough space and thus begin using the virtual memory of the host to a large degree, thereby leading to "thrashing" (i.e., continual replacement of pages in the system). For optimum performance, the size of the real memory of the target is preferably made smaller than that available on the host. However, FIG. 5 illustrates that the invention can be used in the situation where the real memory of the target is larger than that of the host system.

While the policy of mapping a target virtual address to a target real address need not be understood by the emulator, it must have access to the table that contains the actual mapping and must know when it is modified. One way to do this is to keep a simulated copy 610 of the page table, as shown in FIG. 6.

In addition to the information contained in the original page table, the simulated page table 610 could keep additional information that facilitates mapping of the address to a host virtual memory address. Such a simulated page table 610 may include the target page mapping table 510 and the simulated target real-to-host virtual mapper 520 of FIG. 5. In the trivial case, for example, when a contiguous chunk of host virtual memory maps the entire real memory of the target, the mapping from the target real address to the host virtual address involves simply the addition of a constant offset.

In addition, the simulated page table 610 could contain information about the access rights to each page in a form that makes it easy for the emulation system to enforce those rights.

Figure 6:
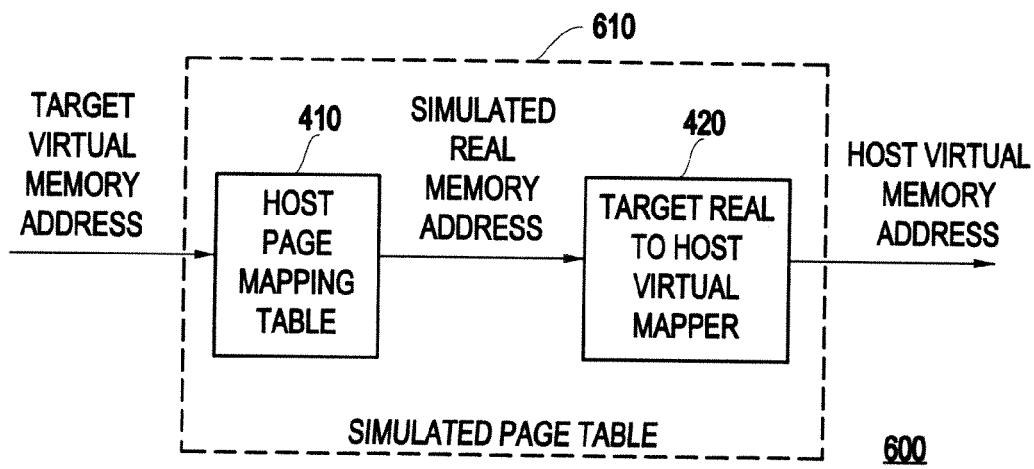
FIG. 6 shows a structure 600 illustrating a mapping function of a simulated page table 610.

Hence, in FIG. 6, both functions of table 510 and mapper 520 are merged into one functional block (only one layer as opposed to two layers), which simplifies and increases the operation speed of the emulation. That is, going through each of these tables separately involve extra software instructions when translating LOAD and STORE instructions (which make up more than approximately ⅓ of the total number of instructions). Thus, by only going through one table minimizes the amount of instructions (e.g., maybe 5-6 instructions) for each translation needed to process.

It is noted that the invention pertains to all types of instructions, but is optimized for LOADs and STOREs, which, as mentioned above, make up a large part of all instruction sets. That is, performance is enhanced since the invention optimizes the treatment of, and deals most efficiently with, these type of instructions.

Figure 7:
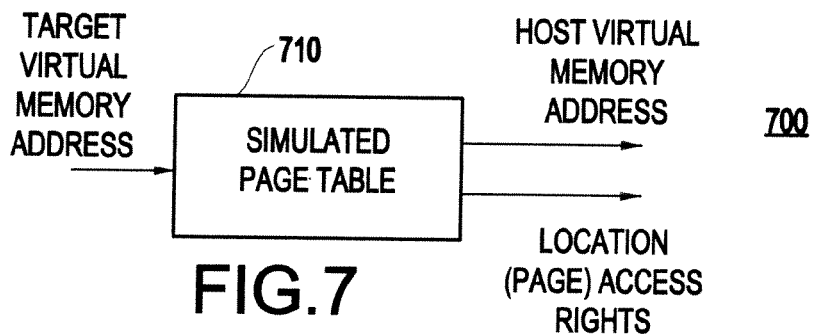
FIG. 7 shows a structure 700 illustrating a mapping and protection information provided by a simulated page table 710.

As depicted in the structure 700 of FIG. 7, one can view the function of the simulated page table 710 (e.g., similar to the table 610) as that of mapping a target virtual address to a host virtual address along with host access privileges to the page containing the address.

Thus, FIG. 7 shows a more general view of FIG. 6, but also shows the mapping (and storing and accessing) of privilege information as well. Generally, the privilege information is information which is associated with each page (e.g., each page having on the order of about 4000 bytes). When there is an access to a location, the page table 710 is referred to as it contains privilege information directed to accessing the page. Hence, the privilege information contained in the page table 710 is associated with each page.

It is noted that, while FIGS. 4 through 7 show the path taken by each access in the target machine, it must be understood that it is often possible to analyze several addresses together and classify them so that the simulated page table access need be made just once for several accesses. This can be done, for example, in the optimization phases of translating the target code to host code. While it may be possible to perform such optimization on the translation of even a single instruction (e.g., a CISC RX instruction), there are more opportunities of this type that arise when translating groups of instructions, for example, instructions in a basic block.

Figure 8:
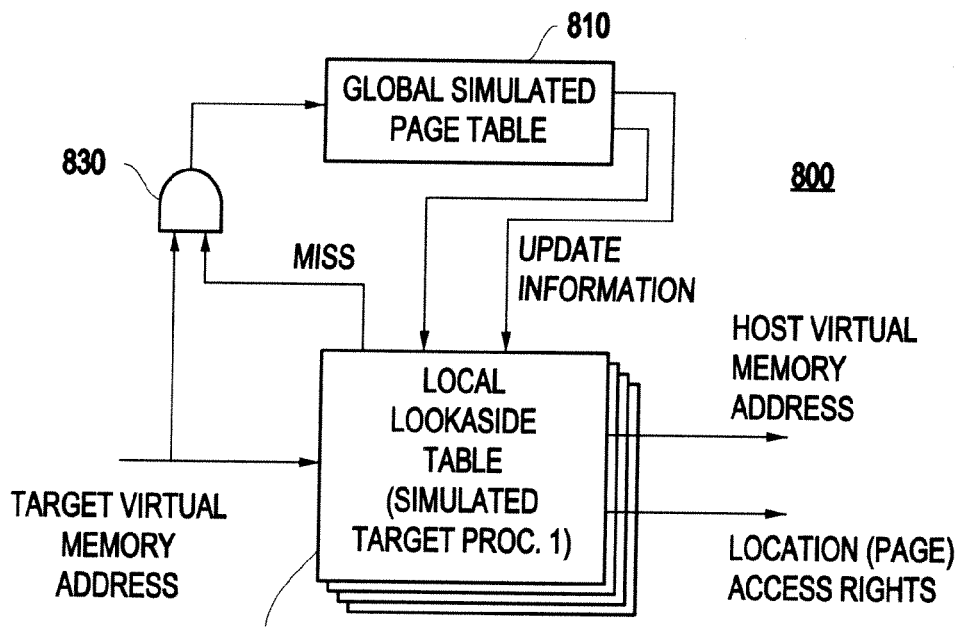
FIG. 8 shows a structure 800 illustrating local lookaside tables 820 (LLT) and their relationship to a global page table 810.

Turning now to the structure 800 of FIG. 8, it is noted that the page table may become rather large because generally one of two accessing (translation) schemes is performed.

For example, when one simulates a page table of the host, for example, an inverted page table, one indexes from the real address to get the virtual address. Alternatively, the regular page table gets the virtual address and then goes through a plurality of hierarchical tables in order to get the real address.

Thus, since these tables are becoming so large, accessing of the information may take a long time, and further having all of the information in a central location means that even getting information regarding all of these accesses may involve going from one processor to another processor, and therefore caching of information should be performed. More specifically, caching information local to each processor (e.g., target processor) would be advantageous, to speed up the entire operation.

Further, it is noted that, since multiple target processors may be simultaneously accessing locations in memory, it is possible that a processor may be changing the contents of the simulated page table while another needs to access it. For correctness therefore, all accesses to the page table should be protected using locks. However, this makes the access overhead rather prohibitive.

In view of the foregoing, to reduce the overhead, the invention in FIG. 8 provides a local cache of the entries in a page table 810, one cache per simulated processor. This cache, shown as the Local Lookaside Table (LLT) 820 in FIG. 8, contains information only about the recent pages accessed by the corresponding target processor.

Access to the LLT by the thread simulating the processor need not be locked because the threads emulating the other processors will not access this LLT 820. However, updates to the LLT 820 may need to be made, for example, when an entry in the global table 810 is removed. Since this situation is expected to be rare, it suffices to block the thread emulating the processor while its LLT 820 is changed. The global table entry could keep a list of processor threads that have a copy of that entry to minimize the number of disrupted threads.

Hence, in operation, in the target processor, a target virtual memory address is generated and is input simultaneously to a buffer (AND gate) 830 and the LLT 820 (e.g., again, "local" meaning on the target processor). If the information is present in the LLT 820, then the LLT 820 sends the host virtual memory address and the location (page) access rights.

If there is a "miss" in the LLT 820, then a signal is sent to the buffer 830, which in turn issues a signal to the global simulated page table 810 requesting the information. The table 810, which is quite large, then finds the desired page having the requested information, and then sends the page with the information (and the privileges) to the LLT 820, thereby updating the LLT 820. The LLT 820 in turn sends the host virtual memory address and the location (page) access rights (privileges) to the requestor.

It is noted that, if the requestor does not have the privileges for the page requested, then the host virtual memory address may still be output by the LLT 820, but it will not be returned back to the requestor.

FIG. 9 shows a sample page table entry 900 in the global page table 810 incorporating this information, and shows the details of the table itself and its entries. It is noted that the table 900 includes information on validity/status bits 910, process ID 920, virtual address 930, real address 940, protection bits 950, and lookaside mask 960. The lookaside mask 960 is a bit pattern which indicates which processors in the system have cached a portion of the desired information.

Thus, for example, FIG. 9 indicates that, assuming there are eight (8) simulated target processors numbered 0 . . . 7, the first entry is cached in the LLT of processors 1, 2, and 6, while the second entry is cached only in the LLT of processor 3.

When an access misses in an LLT 820, it may be because the corresponding entry was not copied over to the LLT 820, or because the corresponding page is not currently mapped to a host virtual address. The emulator thread that misses gets access through a lock to the global page table 810 to determine which case it is.

If the corresponding entry already exists in the global table 810, then it is copied over the LLT 820, possibly replacing one of the lines there. If the entry does not exist in the global table 810, then a page fault in the target system is simulated. This invokes the page fault handler in the operating system of the machine being simulated, and causes the required page to be brought in.

Figure 10:
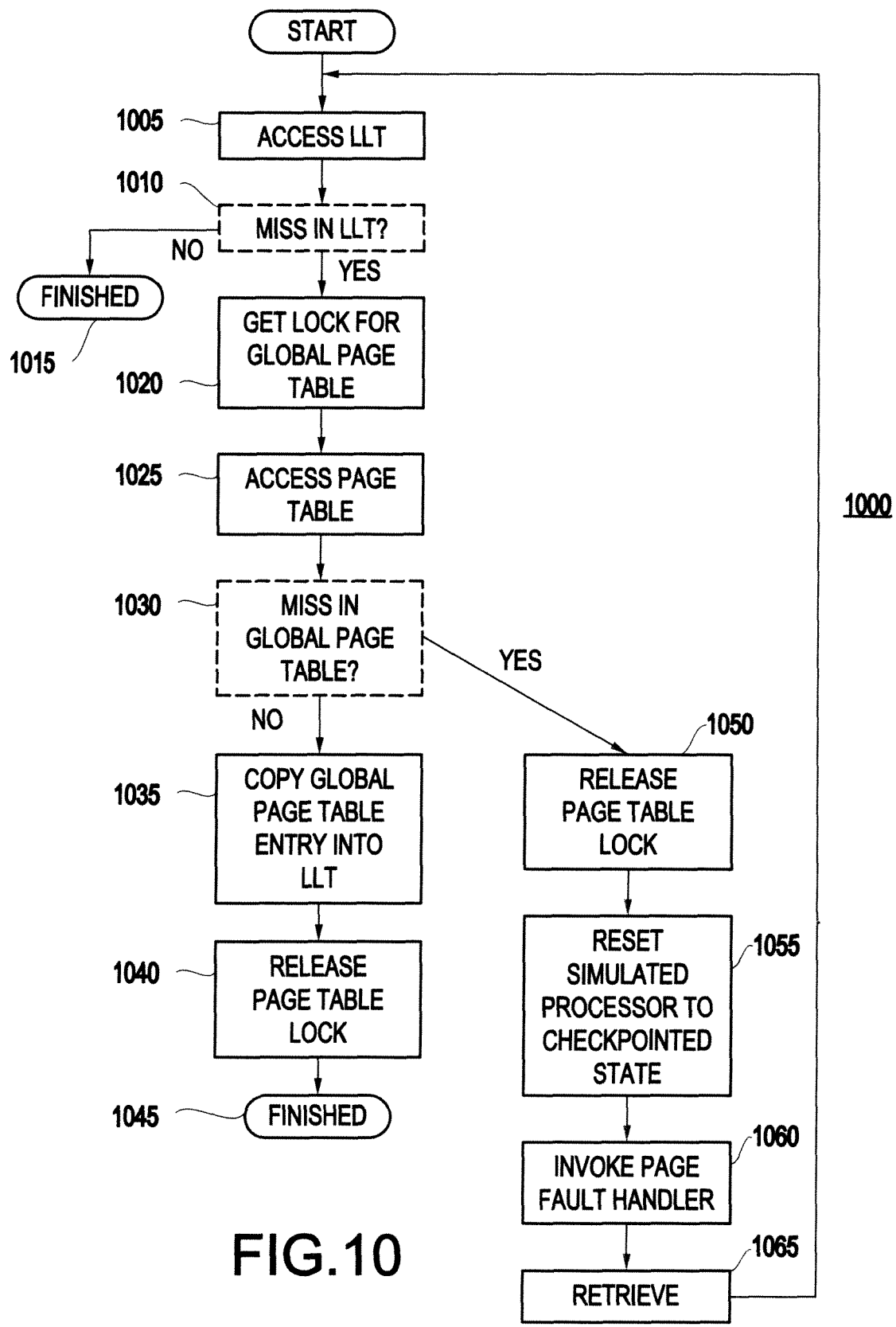
FIG. 10 shows a method 1000 including the steps involved in accessing a page table entry.

FIG. 10 illustrates the steps in a method 1000 describing the above process. In a real machine, the handling of a page fault usually causes a context switch with the target processor requesting the page scheduling another task for execution. Similarly, in the emulated machine, the page fault does not block the thread emulating the processor that caused the page fault.

Turning to the method 1000 (and referring to the structure 800 in FIG. 8), in step 1005, an access is made (e.g., a target virtual memory address is input) to the LLT 820.

In step 1010, it is determined whether there is a "miss" in the LLT 820. If there is not a "miss" (e.g., a "hit"), then the process finishes.

If there is a "miss", then in step 1020, a lock is obtained for the global page table 810. Such a lock is used to avoid multiple processors accessing (and clearing) at the same time, for coherency purposes.

In step 1025, the page table is accessed, and in step 1030 it is determined whether there is a miss in the global page table 810.

If there is not a miss in the global page table (e.g., a "hit"), then in step 1035 the global page entry is copied into the LLT 820. In step 1040, the page table lock is released and in step 1045 the process finishes. It is noted that "finishing" in the context of the invention means, for example, effecting a successful translation (e.g., for LOAD or STORE, etc.). By the same token, it could still miss in the cache.

Conversely, if there is a "miss" in the global page table 810 (e.g., a "YES" in step 1030), then in step 1050, the page table lock is released. That is, the lock is released so that no processor is "sitting on" the request (e.g., the locking request) for too long, since doing so would tie up the resources of the table and LLT and not allow other processors to get access to such resources. Hence, if there is a miss, the lock is released to allow other users to relatively immediately use the table 820.

Then, in step 1055, the simulated processor is reset to a checkpointed state. That is, this step is performed because the simulated processor may have gotten ahead of itself (e.g., beyond the page fault), and the system needs to bring the simulated processor back to the last checkpointed state at which the simulated processor was operating correctly.

In step 1060, the page fault handler is invoked in the host operating system to determine the page fault, commencing from the checkpointed state.

In step 1065, the page fault handler attempts to retrieve the missing page, thereby finding and placing the missing page in the global page table 820.

Then, the method loops back to step 1005, and the above emulation method is performed again. Presumably, this subsequent time a "hit" will occur in step 1030 (e.g., a "NO" in step 1030).

FIG. 11 illustrates a typical hardware configuration of an information handling/computer system for use with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, as described above, with the present invention, the memory addressing of a multiprocessing system can be efficiently mapped when it is emulated using the virtual memory addressing of another multiprocessing system.

That is, the invention has provided a unique solution to the memory mapping problem in a multiprocessing environment where there is a many-to-many mapping, and where there is not actual, strict control over the software running on the target.

Further, the invention allows for emulation which efficiently maps the shared memory and specifically enhances emulation by emulating not only operations, but also the memory, the access functions, etc. Indeed, the invention recognizes (and considers) that in any mapping, there is involved both mapping a location to a real location, as well as a mapping of privileges in accessing that location. The invention takes both of these into account.

Hence, the invention can more efficiently and more optimally map the memory address of one system, when it is emulated, using the virtual memory addressing of another system. Using the virtual memory addressing of another system for emulation is a key advantage of the invention. As mentioned above, using a virtual memory allows for a much larger space when mapping occurs. Thus, a 64-bit virtual memory of the target (guest) can be targeted (mapped) to a 64-bit virtual memory of the host, whereas if the same memory was to be mapped to a real memory, then only 32-bit may be possible.

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A system for emulating a target system's memory addressing, comprising:
   a host multiprocessor system executing an emulation software package; and
   a memory system accessible to processors of said host multiprocessor system, wherein is stored a page table, as tangibly embodied in said memory system, for mapping a target virtual memory address from a target system to a host virtual memory address and page access rights for said target virtual memory address,
   wherein said target system comprises a multiprocessor system and said page table contains entries including information on a validity/status bit, a process identification, a virtual address, a real address corresponding to the virtual address, a protection bit, and a lookaside mask, said lookaside mask being a bit pattern which indicates which processors in the target system have cached a portion of desired information, and
   wherein said target system is oblivious to the software it is running on, meaning that the emulation software is unaware of an allocation of tasks to processors in the target system.

2. The system of claim 1, wherein said page table includes means for analyzing several addresses together and classifying them so that a simulated page table access is made once for a plurality of accesses.

3. The system of claim 1, wherein said target system includes a local lookaside table (LLT) for caching locally, on said target system, said host virtual memory address corresponding to said target virtual memory address.

4. The system of claim 3, wherein said target system comprises a plurality of processors and said host comprises a multiprocessor system, said system further comprising:
   in said host multiprocessor system, one said LLT being provided for each simulated processor of said target multiprocessor system, said LLT containing information about recent pages accessed by a corresponding target system of claim processor.

5. The system of claim 4, wherein an access to the LLT by a thread simulating the simulated processor is not locked, and
   wherein threads emulating other processors in said target multiprocessor system do not access the LLT.

6. The system of claim 4, further comprising:
   a buffer for receiving said target virtual memory address substantially simultaneously with said target virtual memory address being received by the LLT,
   wherein if said target virtual memory address is present in the LLT, then the LLT sends the host virtual memory address and location access rights to the host multiprocessor system.

7. The system of claim 3, wherein if there is a "miss" in the LLT, then a signal is sent to a buffer,
   said buffer issuing a signal to a page table requesting the information.

8. The system of claim 7, wherein said page table finds a desired page having requested information, and sends the page with the information and privileges to the LLT, said privileges including page access rights, and
   wherein said LLT sends the host virtual memory address and page access rights to a requestor.

9. The system of claim 1, further comprising:
a lock for locking said page table when an access is made thereto.

10. A system for emulating a target system's memory addressing using a virtual-to-real memory mapping mechanism of a host multiprocessor system's operating system, said system comprising:
a host multiprocessor system upon which is executing an emulation software for a target multiprocessor system; and
a memory on said host multiprocessor system, wherein is stored:
a local lookaside table (LLT) for receiving a target virtual memory address and outputting a host virtual memory address and page access rights, for any information on said target virtual memory address stored in said LLT; and
a page table for receiving said target virtual memory address and providing said host virtual memory address corresponding to said target virtual memory address,
wherein said page table updates the LLT with the host virtual memory address information corresponding to said target virtual memory address when it is not found in said LLT, and
wherein said target multiprocessor system is oblivious to software it is running on, meaning that the emulation software is unaware of an allocation of tasks to processors in the target multiprocessor system.

* * * * *